(12) United States Patent
Witt (10) Patent No.: US 6,584,556 B1
(45) Date of Patent: Jun. 24, 2003

(54) MODULO ADDRESS GENERATION METHOD AND APPARATUS

(75) Inventor: David B. Witt, Austin, TX (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/537,020

(22) Filed: Mar. 28, 2000

(51) Int. Cl.[7] .............................................. G06F 12/00
(52) U.S. Cl. ..................... 711/217; 711/110; 711/210; 711/218
(58) Field of Search ................... 711/110, 210, 711/217, 218

(56) References Cited

U.S. PATENT DOCUMENTS

| | | | | |
|---|---|---|---|---|
| 5,511,017 A | * | 4/1996 | Cohen et al. | 708/491 |
| 5,659,700 A | * | 8/1997 | Chen et al. | 711/213 |
| 5,790,443 A | * | 8/1998 | Shen et al. | 708/491 |
| 5,956,757 A | * | 9/1999 | Sun | 360/49 |
| 6,047,364 A | * | 4/2000 | Kolagotla et al. | 711/211 |
| 6,049,858 A | * | 4/2000 | Kolagotla et al. | 711/217 |
| 6,073,228 A | * | 6/2000 | Holmqvist et al. | 711/200 |
| 6,209,076 B1 | * | 3/2001 | Blomgren | 711/214 |

* cited by examiner

Primary Examiner—Reba I. Elmore
(74) Attorney, Agent, or Firm—Bromberg & Sunstein LLP (57) ABSTRACT

A two-stage, pipelined modulo address generator (MAG) (30') for generating from a current pointer into a circular buffer of size L, a next pointer into the buffer, is comprised of a pointer generation stage (32') and a modulo correction and pointer selection stage (34'), each adapted to operate in a selected one of two modes. In the first operating mode: the pointer generation stage (32') generates a sequential pointer which is a selected offset from the current pointer; and the modulo correction and pointer selection stage (34') generates, modulo L, a modulo corrected sequential pointer, and provides as the next pointer the sequential pointer, if it is in the buffer, and the modulo corrected sequential pointer, otherwise. In the second operating mode: the pointer generation stage (32') generates a lookahead pointer which is twice the selected offset from the current pointer; and the modulo correction and pointer selection stage (34') generates, modulo L, a modulo corrected lookahead pointer and, modulo 2L, a double-modulo corrected lookahead pointer, and provides as the next pointer the lookahead pointer, if it is in the buffer, the modulo corrected lookahead pointer, if the lookahead pointer is not in the buffer but the modulo corrected lookahead is in the buffer, and the double-modulo corrected lookahead pointer, otherwise.

12 Claims, 7 Drawing Sheets

LoopSize = 1

| B = | 0 |
|---|---|
| M = | 1 |
| L = | 8 |
| $I_0$ = | 0 |

| t | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| I | 0 | 1 | 2 | 3 | 4 | 5 | 6 | 7 | 0 | 1 | 2 | 3 | 4 | 5 | 6 | 7 |
| (I+M) | 1 | 2 | 3 | 4 | 5 | 6 | 7 |   | 1 | 2 | 3 | 4 | 5 | 6 | 7 |   |
| (I+2M) |   | 2 | 3 | 4 | 5 | 6 | 7 | 8 | 9 |   | 3 | 4 | 5 | 6 | 7 | 8 |
| (B+L) | 8 |   |   |   |   |   |   |   |   |   |   |   |   |   |   |   |
| (B+2L) |   | 16 |   |   |   |   |   |   |   |   |   |   |   |   |   |   |
| ((I+M)−L) |   | −7 | −6 | −5 | −4 | −3 | −2 | −1 | 0 | −7 | −6 | −5 | −4 | −3 | −2 | −1 |
| ((I+2M)−L) |   |   | −6 | −5 | −4 | −3 | −2 | −1 | 0 |   | −5 | −4 | −3 | −2 | −1 | 0  |
| ((I+2M)−2L) |   | −14 | −13 | −12 | −11 | −10 | −9 | −8 | −7 | −14 | −13 | −12 | −11 | −10 | −9 | −8 |
| ((I+M)−(B+L)) |   | −7 | −6 | −5 | −4 | −3 | −2 | −1 | 0 | −7 | −6 | −5 | −4 | −3 | −2 | −1 |
| ((I+2M)−(B+L)) |   |   | −6 | −5 | −4 | −3 | −2 | −1 | 0 |   | −5 | −4 | −3 | −2 | −1 | 0 |
| ((I+2M)−(B+2L)) |   | −14 | −13 | −12 | −11 | −10 | −9 | −8 | −7 | −14 | −13 | −12 | −11 | −10 | −9 | −8 |

Fig. 5B

LoopSize = 2

| t | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| I | 0 | 1 | 2 | 3 | 4 | 5 | 6 | 7 | 0 | 1 | 2 | 3 | 4 | 5 | 6 | 7 |
| (I+M) | 1 |   | 2 |   | 3 |   | 4 |   | 5 |   | 6 |   | 7 |   | 8 |   |
| (I+2M) |   |   | 8 | 8 | 8 | 8 | 8 | 8 | 8 | 8 | 8 | 8 | 8 | 8 | 8 | 8 |
| (B+L) | 8 |   |   |   |   |   |   |   |   |   |   |   |   |   |   |   |
| (B+2L) |   |   |   |   |   |   |   |   |   |   |   |   |   |   |   |   |
| ((I+M)−L) |   | −7 | −6 |   | −5 |   | −4 |   | −3 |   | −2 |   | −1 |   | 0 |   |
| ((I+2M)−L) |   |   |   | −6 |   | −5 |   | −4 |   | −3 |   | −2 |   | −1 |   | 0 |
| ((I+2M)−2L) |   |   |   |   |   |   |   |   |   |   |   |   |   |   |   |   |
| ((I+M)−(B+L)) |   | −7 | −6 |   | −5 |   | −4 |   | −3 |   | −2 |   | −1 |   | 0 |   |
| ((I+2M)−(B+L)) |   |   |   | −6 |   | −5 |   | −4 |   | −3 |   | −2 |   | −1 |   | 0 |
| ((I+2M)−(B+2L)) |   |   |   |   |   |   |   |   |   |   |   |   |   |   |   |   |

Fig. 6A — LoopSize = 1; B = 0, M = 5, L = 8, I₀ = 0

| t | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| I | 0 | 5 | 2 | 7 | 4 | 1 | 6 | 3 | 0 | 5 | 2 | 7 | 4 | 1 | 6 | 3 |
| (I+M) | 5 | 10 | 15 | 12 | 17 | 14 | 11 | 16 | 13 | 10 | 15 | 12 | 17 | 14 | 11 | 16 |
| (I+2M) |  | 10 | 15 | 12 | 17 | 14 | 11 | 16 | 13 |  |  |  |  |  |  |  |
| (B+L) | 8 | 16 |  |  |  |  |  |  |  |  |  |  |  |  |  |  |
| (B+2L) |  | 16 |  |  |  |  |  |  |  |  |  |  |  |  |  |  |
| ((I+M)−L) | −3 |  | −6 | −1 | −4 | 1 | −2 | 3 | −5 | 0 | −3 | 2 | 7 | −6 | −1 | 4 | 9 | −2 | 3 |
| ((I+2M)−L) |  | 2 | 7 | −1 | −4 | 1 | −2 | 3 | −5 | 0 | −3 |  |  |  |  |  |
| ((I+M)−(B+L)) | −3 |  | 2 | 7 | −4 | 1 | −2 | 3 | −5 | 0 | −3 | 2 | 7 | −6 | −1 | 4 | 9 | −2 | 3 |
| ((I+2M)−(B+L)) |  | −6 | 2 | 7 | −4 | 1 | −2 | 3 | −5 | 0 | −3 |  |  |  |  |  |

Fig. 6B — LoopSize = 2

| t | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| I | 0 | 5 | 2 | 7 | 4 | 1 | 6 | 3 | 0 | 5 | 2 | 7 | 4 | 1 | 6 | 3 |
| (I+M) | 5 |  | 10 | 8 | 7 | 12 | 8 | 4 | 9 | 8 | 6 | 8 | 6 | 11 | 3 | 8 | 0 |
| (I+2M) |  |  | 8 | 8 |  |  |  |  | 8 | 1 | 8 | 6 | 8 | 3 | 8 | 0 |
| (B+L) | 8 |  |  |  |  |  |  |  |  |  |  |  |  |  |  |  |
| (B+2L) |  |  |  |  |  |  |  |  |  |  |  |  |  |  |  |  |
| ((I+M)−L) | −3 |  |  | 2 |  | −1 |  | 4 |  | 1 |  | −2 |  | 3 |  | 8 | 0 |
| ((I+2M)−L) |  |  |  |  |  |  |  |  |  | 1 |  | −2 |  | 3 |  | 8 | 0 |
| ((I+M)−(B+L)) | −3 |  |  | 2 |  | −1 |  | 4 |  | 1 |  | −2 |  | 3 |  | 8 | 0 |
| ((I+2M)−(B+L)) |  |  |  |  |  |  |  |  |  |  |  |  |  |  |  |  |

Fig. 7A

LoopSize = 1
B = 0
M = 5
L = 8
I₀ = 3

| t | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| I | 3 | 0 | 5 | 2 | 7 | 4 | 1 | 6 | 3 | 0 | 5 | 2 | 7 | 4 | 1 | 6 |
| (I+M) | 8 | 13 | 10 | 15 | 12 | 17 | 14 | 11 | 16 | 13 | 10 | 15 | 12 | 17 | 14 | 11 |
| (I+2M) |  |  |  |  |  |  |  |  |  |  |  |  |  |  |  |  |
| (B+L) | 8 |  |  |  |  |  |  |  |  |  |  |  |  |  |  |  |
| (B+2L) | 16 |  |  |  |  |  |  |  |  |  |  |  |  |  |  |  |
| ((I+M)−L) | 0 | 5 | 2 | 7 | 4 | 9 | 6 | 3 | 8 | 5 | 2 | 7 | 4 | 9 | 6 |  |
| ((I+2M)−L) |  | −3 | −6 | −1 | −4 | 1 | −2 | −5 | 0 | −3 | −6 | −1 | −4 | 1 | −2 |  |
| ((I+2M)−2L) |  |  |  |  |  |  |  |  |  |  |  |  |  |  |  |  |
| ((I+M)−(B+L)) | 0 | 5 | 2 | 7 | 4 | 9 | 6 | 3 | 8 | 5 | 2 | 7 | 4 | 9 | 6 |  |
| ((I+2M)−(B+L)) |  | −3 | −6 | −1 | −4 | 1 | −2 | −5 | 0 | −3 | −6 | −1 | −4 | 1 | −2 |  |
| ((I+2M)−(B+2L)) |  |  |  |  |  |  |  |  |  |  |  |  |  |  |  |  |

Fig. 7B

LoopSize = 2

| t | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| I | 3 | 0 | 5 | 5 | 10 | 2 | 7 | 7 | 12 | 4 | 9 | 1 | 6 | 6 | 11 | 3 |
| (I+M) | 8 |  | 8 |  | 8 |  | 8 |  | 8 |  | 8 |  | 8 |  | 8 |  |
| (I+2M) |  |  |  |  |  |  |  |  |  |  |  |  |  |  |  |  |
| (B+L) | 8 |  |  |  |  |  |  |  |  |  |  |  |  |  |  |  |
| (B+2L) |  |  |  |  |  |  |  |  |  |  |  |  |  |  |  |  |
| ((I+M)−L) | 0 |  | −3 |  | 2 |  | −1 |  | 4 |  | 1 |  | −2 |  | 3 |  |
| ((I+2M)−L) |  |  |  |  |  |  |  |  |  |  |  |  |  |  |  |  |
| ((I+2M)−2L) |  |  |  |  |  |  |  |  |  |  |  |  |  |  |  |  |
| ((I+M)−(B+L)) | 0 |  | −3 |  | 2 |  | −1 |  | 4 |  | 1 |  | −2 |  | 3 |  |
| ((I+2M)−(B+L)) |  |  |  |  |  |  |  |  |  |  |  |  |  |  |  |  |
| ((I+2M)−(B+2L)) |  |  |  |  |  |  |  |  |  |  |  |  |  |  |  |  |

MODULO ADDRESS GENERATION METHOD AND APPARATUS

FIELD OF THE INVENTION

The present invention relates generally to data address generation in a digital data processing system, and, in particular, to a data address generator which generates modulo addresses for addressing data operands stored in a circular buffer.

BACKGROUND OF THE INVENTION

Digital processing of analog signals is critical to many important commercial applications, including such diverse fields as telecommunication networks, audio and video presentation devices, and computer controlled systems. Such applications typically utilize classic time-invariant algorithms, such as digital filtering and Fourier transforms. Although differing in their implementation details, these algorithms share a common characteristic: dependence upon a basic mathematical operation—the multiply and accumulate ("MAC"). In a "MAC operation", a first data operand is multiplied by a second data operand, and the product is added to the current contents of an "accumulator". In most such applications, the speed with which a MAC operation is performed is considered critical.

If the data operands are themselves simply elements of data operand "vectors", as is often the case, each MAC operation requires pre-loading of an appropriate pair of operands using respective access address "pointers" into the data vectors, and then post-modification of each of the pointers according to a specific address access pattern. Typically, the access patterns are different for each of the data vectors. In some applications, one (or both) of the data vectors may be too large to fit into available system memory at one time, thus requiring further overhead to move each over-sized vector through a conveniently sized "buffer" which is allocated in either system or local memory. In general, each buffer is specified in terms of a starting "base address" and a "modulo" length, and the operands in that buffer are accessed according to an access pattern having a particular step "offset" size. In many algorithms, at least one of the buffers is accessed in a modulo manner, wherein a pointer that steps beyond the end of the buffer is wrapped, modulo the length of the buffer, back into the buffer. For the purpose of the description that follows, I will use the term "circular buffer" to refer to any memory-based data buffer which is accessed in such a modulo manner, regardless of whether or not the size of the buffer is less than or equal to the size of the data vector which may be stored therein.

In general, it is the presence of an execution unit ("EU") especially designed to efficiently perform an atomic MAC operation that distinguishes a digital signal processor ("DSP") from a general purpose digital data processor. In view of the importance of timely supplying the MAC EU with operands, many DSP's incorporate a pair of special purpose data address generators ("DAGs") to assist the load/store unit ("LSU") in supplying operands to the MAC EU. In such DSP's, a single atomic "MAC instruction" may be provided to allow a programmer to specify both the details of the MAC operation and, via special purpose registers, the characteristics of each of the operand access patterns.

It has occurred to me that application of conventional microprocessor design concepts to DSPs should prove beneficial for numerous reasons. First, the majority of DSP algorithms involve loops. Second, DSP algorithms tend to be computationally intensive. Third, DSP application code is usually relatively small, with relatively few conditional branches, thus reducing the control logic required for branch prediction. Fourth, many modern DSPs have dedicated hardware for loop operations. Finally, the results of such operations are often only interim results which are consumed within the loop and never used again, thus reducing register pressure and traffic through the LSU.

For the purpose of making relative performance comparisons in the description that follows, I shall estimate circuit performance in terms of "units of delay", wherein I define One (1) unit of delay as the time required for an input signal to traverse a typical 3-input NAND gate and settle to the correct output logic level at the input of the next level of logic. Using a state of the art 0.18 micron manufacturing process, One (1) delay unit is approximately One Hundred (100) picoseconds. I will assume that such a typical gate would be implemented as a single, contiguous physical unit or cell of minimal sized transistors with minimum inter-transistor wiring. In all estimates that I shall make herein, I will also assume that, within each discrete functional unit, such as an adder, all requisite gates comprise a single, contiguous physical unit or super-cell so as to minimize inter-gate wiring.

In modern DSP's, the longest stage of the processing "pipeline" is the single-cycle MAC EU. Using current state of the art logic design, the critical speed path through a MAC EU is approximately Forty (40) delay units. Thus, the maximum clock rate for such a design would be on the order of Two Hundred Fifty (250) MHz. In contrast, the critical speed path through a current state of the art DAG is approximately Twenty (20) delay units. Since the DAG is already twice as fast as it needs to be to keep up with the MAC EU, there has been little incentive to improve its performance, particularly since such improvement would come only at the cost of additional hardware, power consumption, waste heat, etc.

In the field of general purpose digital data processors, it has been demonstrated that considerable improvement in performance can be achieved by employing a very deep pipeline, on the order of Twelve (12) stages or more, and increasing the clock rate accordingly. In high performance processors, careful attention is given to partitioning the pipeline so as to balance the relative speed paths through each stage. A significant imbalance may indicate the desirability of splitting that stage into multiple stages or of augmenting that stage with additional hardware resources. In either case, the consequences on relative cost to performance must be considered.

In a modern deeply pipelined microprocessor, such as the "Alpha" (originally designed by engineers working for the Digital Equipment Company), the theoretical clock-cycle-limiting pipe stage is considered to consist of an input latch, a minimum arithmetic logic unit ("ALU") operation, and result forwarding back to the input latch, requiring about Eleven (11) delay units using current state of the art design techniques. Such a design allows single-cycle ALU forwarding, while achieving high clock frequency rates. It is also close to the minimum time required to drive and sample a state of the art memory array, such as a 64×64 static random access memory (SRAM) array. If such design techniques could be effectively applied to the MAC in a DSP, one might expect to realize commensurate improvement in system performance. However, just deeply-pipelining the MAC is not sufficient to achieve the desired 11-delay-unit clock cycle: the clock-cycle-limiting stage is now the DAG!

Figure 1:
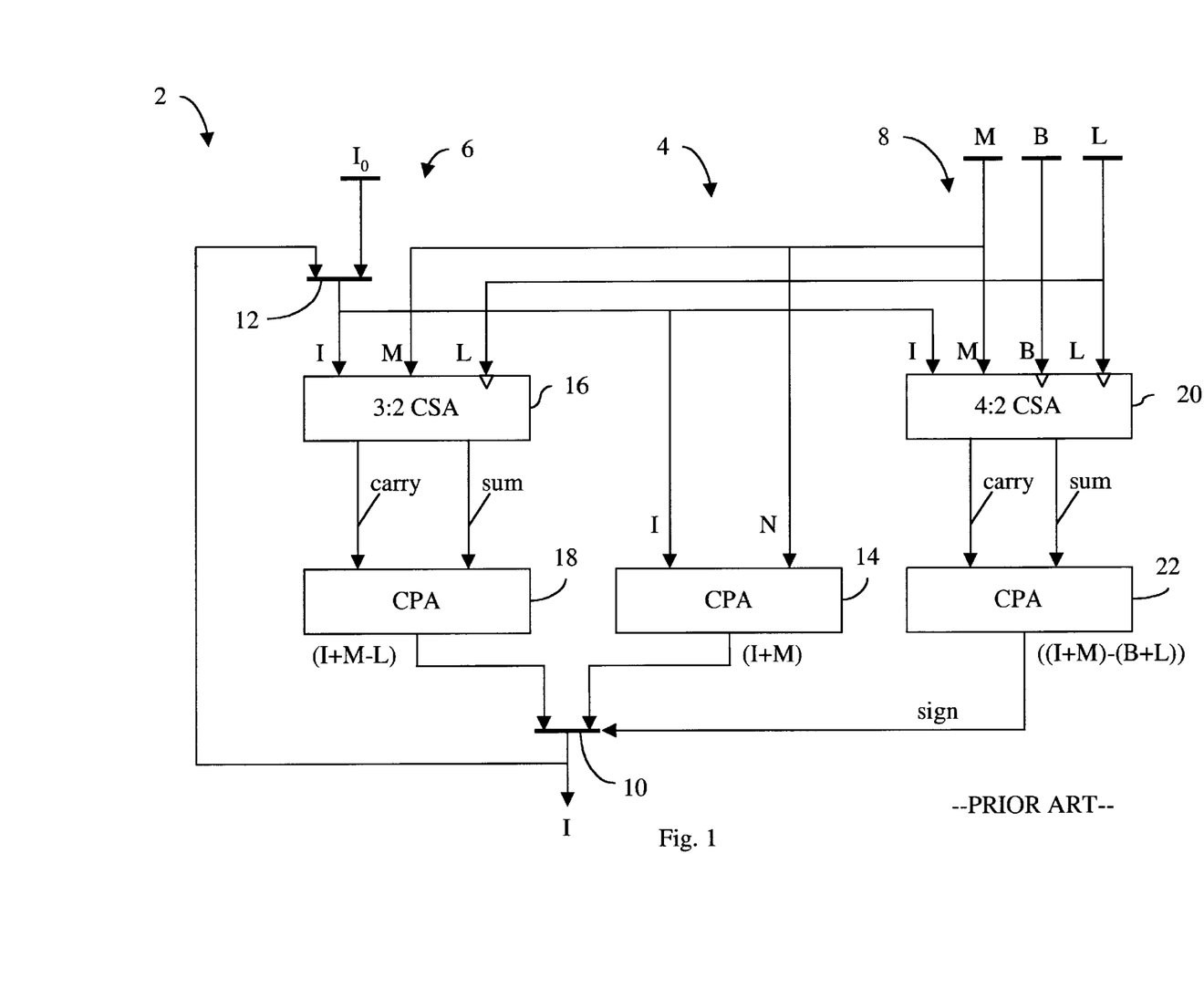
FIG. 1 illustrates in schematic diagram form a prior art DAG.

FIG. 1 illustrates a prior art data address generator (DAG 2) adapted for use in a DSP processor (not shown) having at least One (1), memory resident, data operand buffer (not shown), the location and size of which are specified by a base address ("B") and a length ("L"), stored in respective registers (not shown). The single-stage DAG 2 is constructed to generate, each clock cycle, an index pointer ("I") to the next operand in the buffer as a function of B, L, and an offset ("M"). In operation, the index pointer, I, steps through the buffer in increments of M. When I steps beyond the end of the buffer, i.e. where I is greater than (B+L), L is subtracted from I so that I wraps back, modulo L, to a valid address inside the buffer. Such a modulo address generation method can be described by the following algorithm, illustrated in the form of pseudocode:

for (a=0; a<LoopCount; a++)
    {
      if ((I+M)<(B+L))
        $I_{a+1}=(I_a+M)$;
      else
        $I_{a+1}=((I_a+M)-L)$;
    }
where:

a is the loop counter;

LoopCount is the number of interations of the loop;

B is the base address of the circular buffer;

M is the step size;

L is the length of the circular buffer;

$I_a$ is the current pointer; and

$I_{a+1}$ is the next pointer.

As shown in FIG. 1, the DAG 2 has three parallel computation paths: a sequential pointer path 4 which assumes that the next I will still be inside the buffer; a modulo correction pointer path 6 which assumes that the next I will be outside the buffer and thus must be modulo wrapped back into the buffer; and a pointer selection path 8 that decides which of the two assumptions is correct and controls a pointer select MUX 10 as appropriate. In normal operation, the initial and subsequent values for I are gated in via an input MUX 12, and the values for B, L and M are provided by respective registers (not shown). Note that the initial value for I need not be B, but may be any desired value so long as it lies between B and (B+L), inclusive. In a typical implementation, the sequential pointer path 4 is comprised of a carry-propagate-adder (CPA 14) which adds M to the last I, and provides a sequential I, i.e., (I+M), to the pointer select MUX 10. The modulo correction pointer path 6 is typically comprised of a carry-save-adder (CSA 16) and a carry-propagate-adder (CPA 18), which, together, add M to the last I, and, simultaneously, subtract L, and provide a modulo corrected I, i.e., (I+M–L), to the pointer select MUX 10. The pointer selection path 8 is comprised of a carry-save-adder (CSA 20) and a carry-propagation-adder (CPA 22), which, together, subtract the sequential pointer limit, i.e., (B+L) from the sequential I, i.e., (I+M), and provide the sign of the difference, i.e., (I+M)−(B+L), to the pointer select MUX 10. In operation, a negative sign indicates that the sequential I is correct, while a positive sign indicates that the modulo corrected I is correct. At an appropriate time, the output of the pointer select MUX 10 is forwarded to the register file (not shown), and simultaneously fed back to CPA 14, CSA 16, and CSA 20, via the MUX 12.

Using state of the art design techniques, the single-cycle prior art DAG 2 of FIG. 1 has a critical speed path of about Seventeen (17) delay units: One (1) delay unit through the MUX 12; Two (2) delay units through the inter-stage latches (not shown) that would typically be provided on the inputs of CPA 14, CSA 16, and CSA 20; Four (4) delay units through each of the conventional CSAs; Eight (8) delay units through each of the conventional CPAs; One (1) delay unit through the pointer select MUX 10; and One (1) delay unit to account for the usual interconnect wiring. Note that the presence of the CSA's earlier in the logic flow path constrains the designer to use slower, static designs for at least CPA 18 and CPA 22. If, in a DSP having a DAG such as that shown in FIG. 1, the MAC operation could be somehow deeply pipelined so that the longest pipe stage has a critical speed path of less than Seventeen (17) delay units, the maximum clock rate for the DSP would then be limited by the speed of the DAG itself.

I have invented just such a deeply-pipelined DSP, as can be seen in my co-pending U.S. Application Ser. No. 09/536, 656, entitled "Pipelined Processor Having Loosely Coupled Side Pipes", filed simultaneously herewith and incorporated herein by reference ("Co-pending Application"). If the full benefits inherent in partitioning the MAC so as to meet the 11-delay-unit-per-clock-cycle goal are to be realized, the speed of the DAG must be significantly improved. Therefore, a need exists for an improved method for modulo address generation, and for a modulo address generator which practices that method. To distinguish my improved design from prior art DAGs, I will hereafter refer to it as a "modulo address generator" or "MAG".

BRIEF DESCRIPTION OF THE DRAWINGS

My invention may be more fully understood by a description of certain preferred embodiments in conjunction with the attached drawings in which:

FIG. 5, comprising

FIG. 6, comprising FIG. 7, comprising

In the following descriptions of the preferred embodiments of my invention, similar elements will be similarly numbered whenever possible. However, this practice is simply for convenience of reference and to avoid unnecessary proliferation of numbers, and is not intended to imply or suggest that my invention requires identity in either function or structure in the several embodiments.

DETAILED DESCRIPTION OF THE PREFERRED EMBODIMENTS

Figure 2:
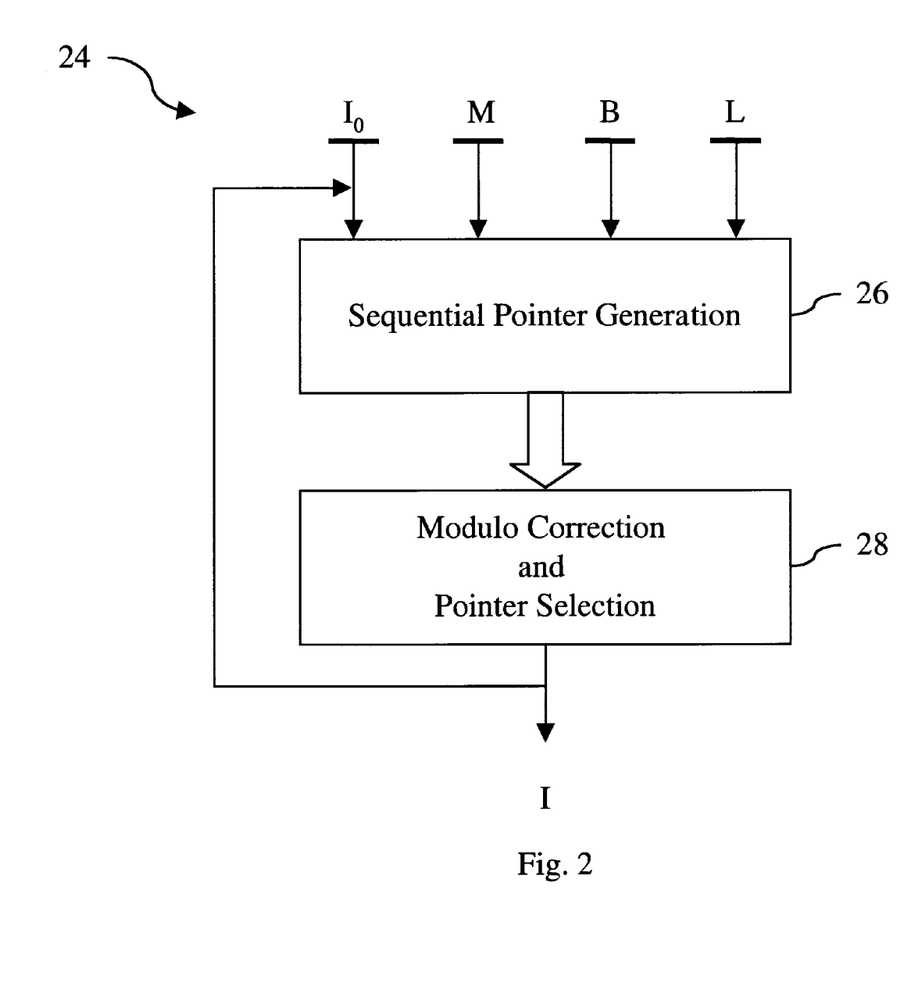
FIG. 2 illustrates in block diagram form a modulo address generator in accordance with one embodiment of my invention.

According to one aspect of my invention, as shown in FIG. 2, a pipelined modulo address generator (MAG 24), adapted for use in a deeply pipelined DSP such as shown in my Co-pending Application, includes Two (2) pipe stages: a sequential pointer generation stage 26 which calculates a sequential pointer to the operand data and, in parallel, the first address following the end of the buffer; and a modulo correction and pointer selection stage 28 that calculates a modulo corrected pointer and, in parallel, compares the sequential pointer to the sequential pointer limit, then selects for output the appropriate pointer. As I will explain below, the longest speed path through either of these stages is approximately Eleven (11) delay units.

In another aspect of the present invention, a two-stage modulo address generator for generating from a current pointer into a circular buffer of size L, a next pointer into the buffer, includes a pointer generation stage and a modulo correction and pointer selection stage. The pointer generation stage is adapted to generate a sequential pointer which is a selected offset M from the current pointer. The modulo correction and pointer selection stage is adapted to generate from the sequential pointer, modulo L, a corrected sequential pointer, and to provide as the next pointer: the sequential pointer, if the sequential pointer is within the buffer; but the corrected sequential pointer, otherwise.

According to yet another aspect of the present invention, a pipelined modulo address generation method for generating from a current pointer into a circular buffer of size L, a next pointer into the buffer, includes the steps of: in a pointer generation stage, generating a sequential pointer which is a selected offset M from the current pointer; and in a modulo correction and pointer selection stage, generating from the sequential pointer, modulo L, a corrected sequential pointer, and providing as the next pointer: the sequential pointer, if the sequential pointer is within the buffer; but the corrected sequential pointer, otherwise.

According to one embodiment of the present invention, a two-stage modulo address generator for generating from a current pointer into a circular buffer of size L, a next pointer into the buffer, the generator being operative in a selected one of first and second modes of operation, includes a pointer generation stage and a modulo correction and pointer selection stage. The pointer generation stage is adapted, in the first mode of operation, to generate a sequential pointer which is a selected offset M from the current pointer and, in the second mode of operation, to generate a lookahead pointer which is twice the selected offset from the current pointer. In the first mode of operation, the modulo correction and pointer selection stage is adapted to generate from the sequential pointer, modulo L, a corrected sequential pointer and to provide as the next pointer: the sequential pointer, if the sequential pointer is within the buffer; and the corrected sequential pointer, otherwise. In the second mode of operation, the modulo correction and pointer selection stage is adapted to generate from the lookahead pointer, modulo L, a corrected lookahead pointer, to generate from the lookahead pointer, modulo 2L, a double-corrected lookahead pointer, and to provide as the next pointer: the lookahead pointer, if the lookahead pointer is within the buffer; the corrected lookahead pointer, if the lookahead pointer is not within the buffer but the corrected lookahead pointer is within the buffer; and the double-corrected lookahead pointer, otherwise. In one embodiment, in the first mode of operation, the modulo address generator generates the next pointer with an associated first latency between generated pointers, and, in the second mode of operation, the modulo address generator generates the next pointer with an associated second latency between generated pointers, wherein the second latency is less than the first latency.

Figure 3:
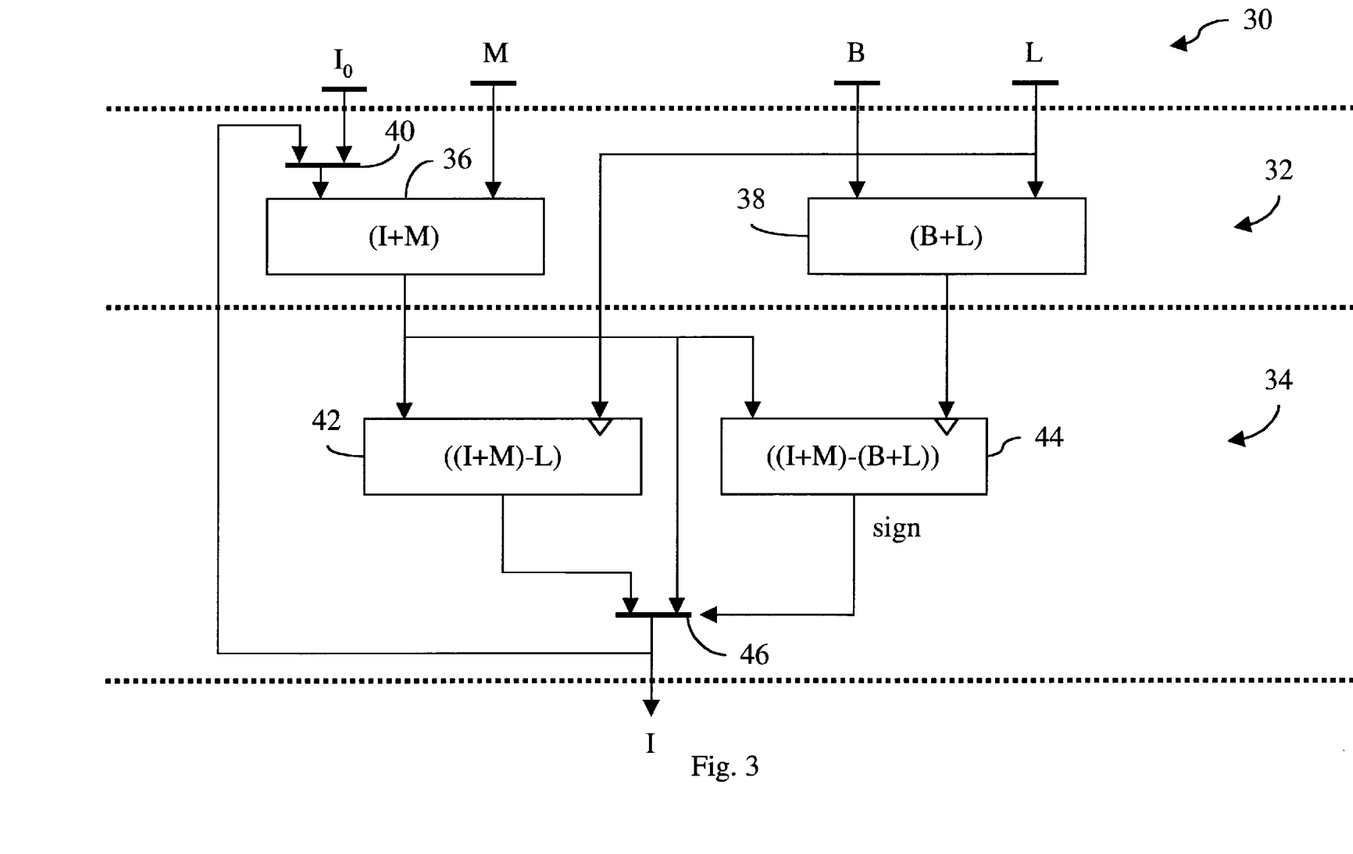
FIG. 3 illustrates in schematic diagram form a modulo address generator as in FIG. 2, but adapted for operation in a multiple instruction loop.

Shown in FIG. 3 is a pipelined MAG 30 comprised of a sequential pointer generation stage 32 and a modulo correction and pointer selection stage 34. In the sequential pointer generation stage 32, a CPA 36 generates the next sequential I by adding the "current" I and M, while a CPA 38 adds B and L. A MUX 40 selects as the "current" I either the initial value, $I_0$, or the most recent value of I forwarded from the modulo correction and pointer selection stage 34 (see, infra). In the modulo correction and pointer selection stage 34, a CPA 42 generates the modulo corrected pointer I by subtracting L from the sequential I, provided by the CPA 36, while a CPA 44 subtracts the sequential pointer limit, (B+L), provided by the CPA 38, from the sequential I, provided by the CPA 36. A MUX 46 selects for output as the next I either the sequential I, provided by the CPA 36, or the modulo corrected I, provided by the CPA 42, depending upon the sign of the difference, ((I+M)−(B+L)), provided by the CPA 44. In operation, a negative sign indicates that the sequential I is correct, while a positive sign indicates that the modulo corrected I is correct. At an appropriate time, the output of MUX 46 is forwarded to the register file (not shown), and simultaneously fed back to CPA 36 via MUX 40.

Using state of the art design techniques, the sequential pointer generation stage 32 of MAG 30 has a critical speed path of about Nine (9) delay units: One (1) delay unit through the MUX 40; Two (2) delay units through the typical inter-stage latches (not shown) that would typically be provided on the inputs of CPA 36 and CPA 38; and Six (6) delay units through each of the conventional CPAs. However, the modulo correction and pointer selection stage 34 has a critical speed path of about Eleven (11) delay units: Two (2) delay units through the typical inter-stage latches (not shown) that would typically be provided on the inputs of CPA 42 and CPA 44; Six (6) delay units through each of the conventional CPAs; One (1) delay unit through the MUX 46; and Two (2) delay units to account for the usual interconnection to the downstream logic. Thus, MAG 30 has an effective speed path of Eleven (11), precisely the desired performance.

Being pipelined, MAG 30 has a worst-case latency of Two (2) cycles, in that it can guarantee a correct value for I no more frequently than every other clock cycle. Ordinarily, this would not be a problem. For example, whenever at least Two (2) instructions are performed within a loop iteration, the MAG 30 will have sufficient time for pointer update. Although the multiple instruction loop is the typical case, it is possible that a loop will contain only a single MAC instruction. In such cases, the MAG 30 of FIG. 3 will stall the MAC EU for a full cycle every loop iteration whenever the LSU is itself capable of sustaining single-cycle dual-operand load operations.

One possible solution to the single-instruction loop problem is to split the single MAC instruction into at least Two (2) consecutive MAC instructions, each of which performs the same calculation as the single MAC instruction, but on respective portions of the data element vectors. Since the results of all calculations are, by definition, "accumulated", the final result of the multi-MAC loop will be identical to that produced by the single-MAC loop. Such a "software pipeline" technique can be easily implemented in a high-level language compiler, or may be done by hand if the original code is written in an assembly language. With at least Two (2) instructions in the loop, MAG 30 is now able to generate the pointers at full speed, effectively interleaving the calculation of the pointers in the manner described above. Although, in general, this solution should be adequate, it is possible that some systems may benefit from a solution in hardware.

Figure 4:
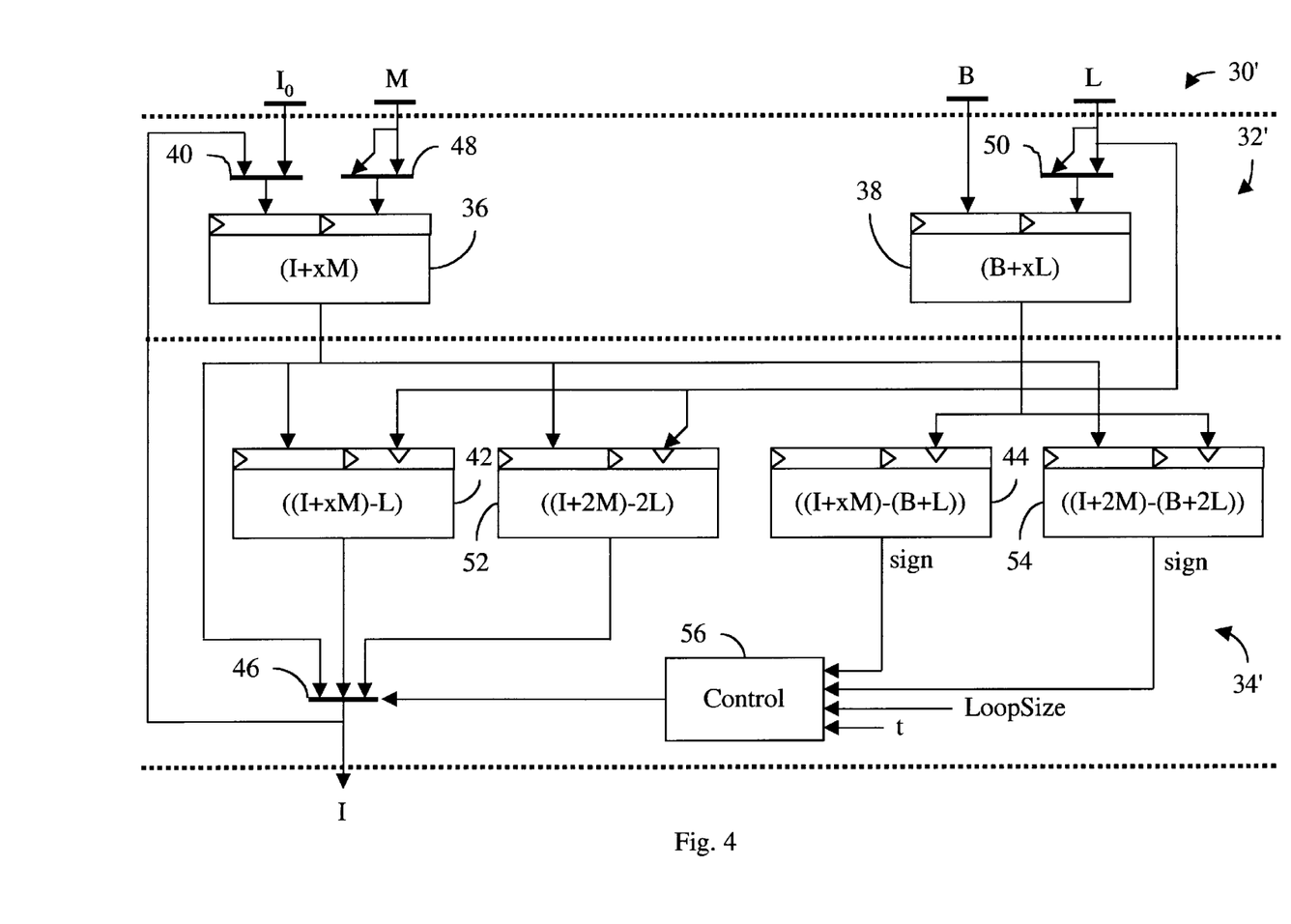
FIG. 4 illustrates in schematic diagram form a modulo address generator as in FIG. 2, but adapted for operation in both single and multiple instruction loops.

FIG. 4 illustrates a MAG 30' that I have designed especially to support both single and multiple instruction loops. As in the MAG 30 of FIG. 3, the MAG 30' is partitioned into Two (2) pipe stages: a sequential pointer generation stage 32' and a modulo correction and pointer selection stage 34'. For convenience of reference, I have indicated the elements that the MAG 30' has in common with the MAG 30 by using the same identifying numbers. In the sequential pointer generation stage 32', I have included a MUX 48 to select either M or 2M for input into CPA 36, so that the output thereof can be selected to be either (I+M) or (I+2M). Similarly, I have included a MUX 50 to select either L or 2L for input into CPA 38, so that the output thereof can be selected to be either (B+L) or (B+2L).

In the modulo correction and pointer selection stage 34', CPA 42 now subtracts L from either (I+M) or (I+2M), selectively provided by CPA 36, while CPA 44 now subtracts (B+L), selectively provided by CPA 38, from either (I+M) or (I+2M), selectively provided by CPA 36. In addition, I have included in the modulo correction and pointer selection stage 34' a CPA 52 to subtract 2L from (I+2M), selectively provided by CPA 36, and a CPA 54 to subtract (B+2L), selectively provided by CPA 38, from (I+2M), selectively provided by CPA 36. A pointer select control 56 controls MUX 46 to output as the next I a selected one of: the sequential I, (I+M), or the lookahead I, (I+2M), selectively provided by the CPA 36; the modulo corrected sequential I, ((I+M)−L), or the modulo corrected lookahead I, ((I+2M)−L), selectively provided by the CPA 42; or the double-modulo corrected lookahead I, ((I+2n)−2L), provided by the CPA 52, according to the following control algorithm, illustrated in the form of pseudocode:

```
if t=0
    I=I₀; /*Use the initial pointer.*/
else if ((LoopSize!=1) OR (t=1))
    { /*Is the sequential pointer in the buffer?*/
        if (((I+M)−(B+L))<0)
            /*Yes, use it.*/
            I=(I+M);
        else
            /*No, use the corrected sequential pointer.*/
            I=((I+M)−L);
    }
else /*LoopSize must be 1 and t must be >1.*/
    /*Is the lookahead pointer in the buffer?*/
    if (((I+2M)−(B+L))<0)
        /*Yes, use it.*/
        I=(I+2M);
    else /*The lookahead pointer is not in the buffer;
        is the corrected lookahead pointer in the buffer?*/
        if (((I+2M)−(B+L))<0)
            /*Yes, use it.*/
            I=((I+2M)−L);
        else /*The corrected lookahead pointer is also not in the buffer;
            so use the double-modulo corrected lookahead pointer.*/
            I=((I+2M)−2L);
``` where:

t is the clock cycle;

B is the base address of the circular buffer;

M is the step size;

L is the length of the circular buffer;

$I_0$ is the initial pointer; and

I is the next pointer.

Figure 5A:
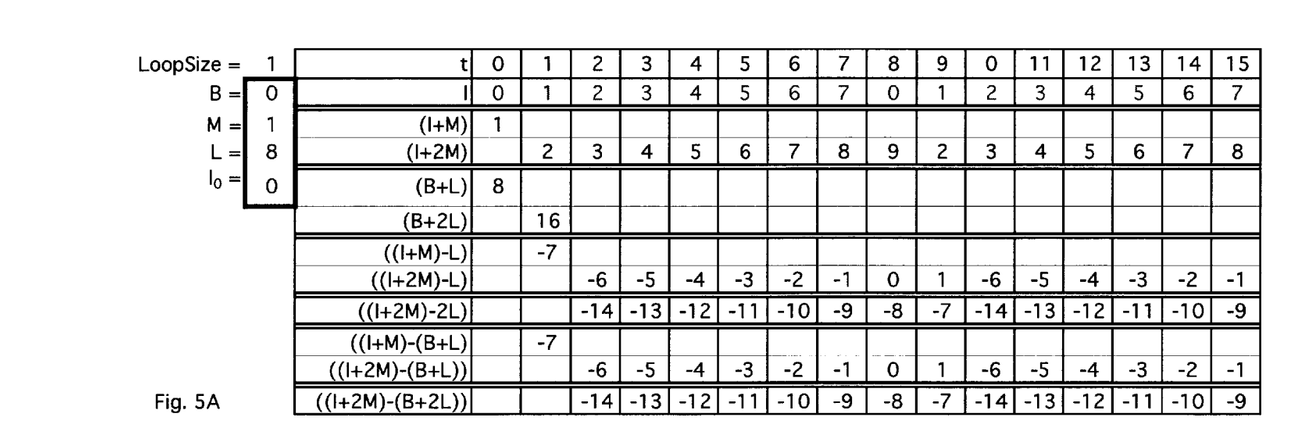
FIG. 5A and FIG. 5B, illustrates in timing diagram form the operation of the modulo address generator of FIG. 4 for a first selected example of circular buffer access parameters.
Figure 5B:
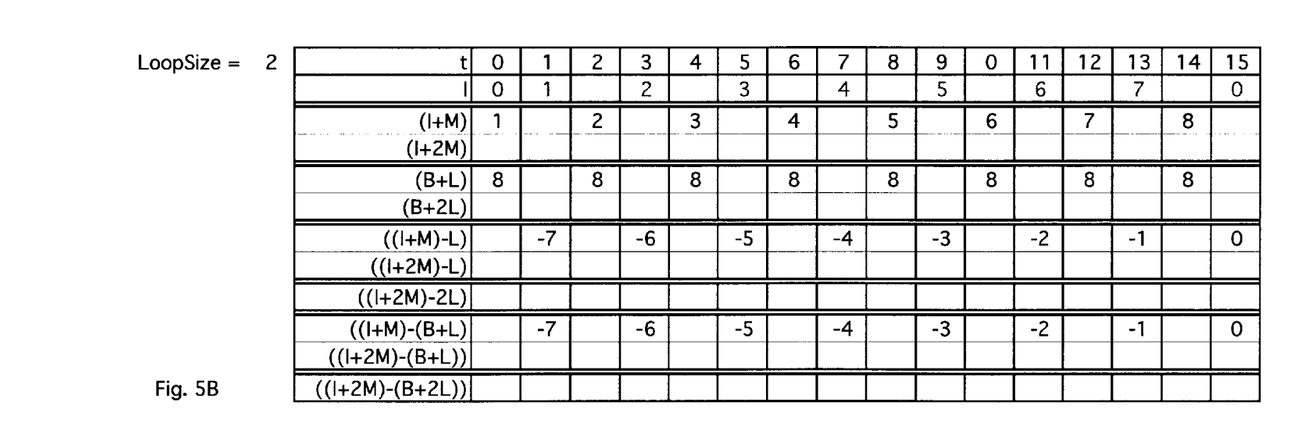
Figure 6A:
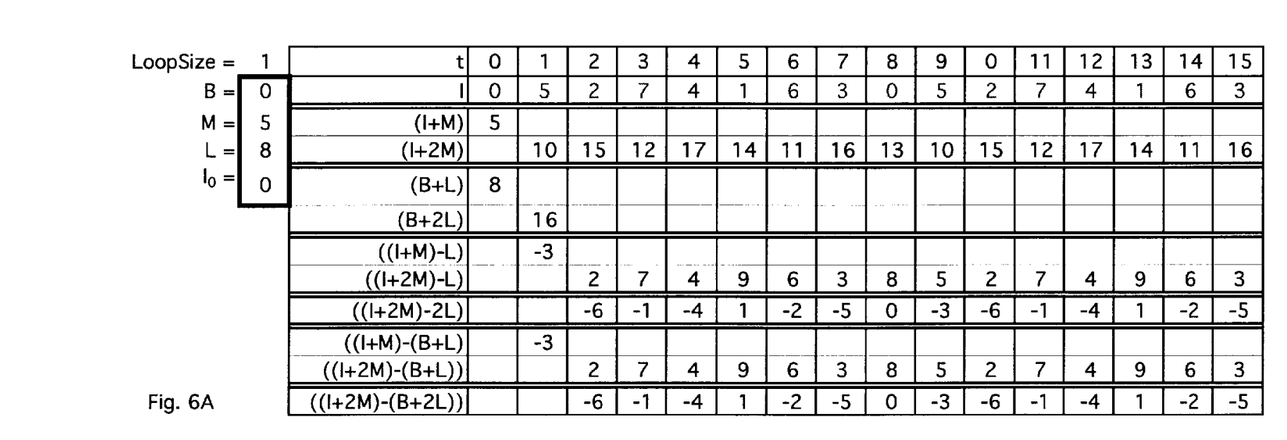
FIG. 6A and FIG. 6B, illustrates in timing diagram form the operation of the modulo address generator of FIG. 4 for a second selected example of circular buffer access parameters.
Figure 6B:
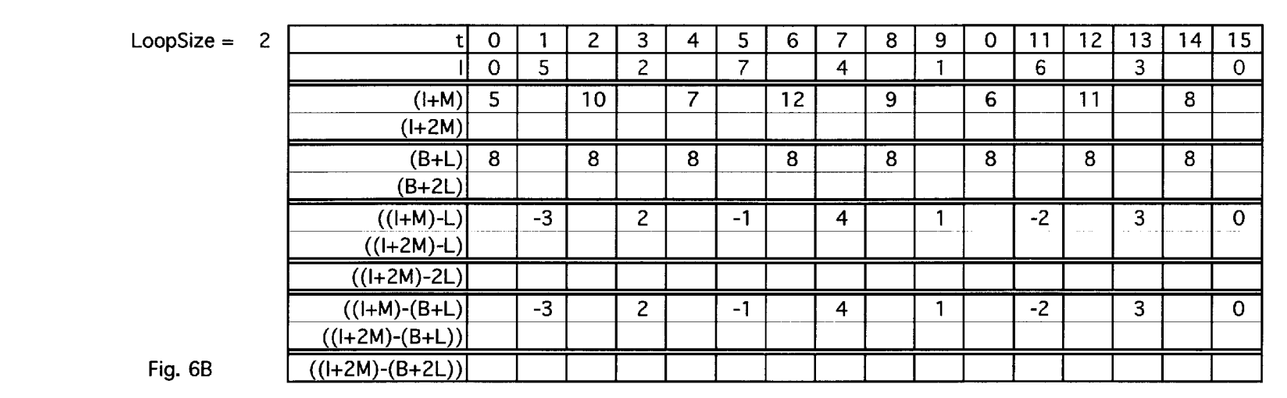

For convenience, I have created a Microsoft® Excel® spreadsheet that operates in accordance with the pseudocode fragment shown above. Shown in FIGS. 5, 6 and 7 are the displays produced by that spreadsheet for selected buffer access parameters. I have submitted herewith, on a computer-readable medium, that spreadsheet in a form that allows viewing (but no modification) of all formulas, and user selection of the access parameters B, M, L and $I_0$. As will be clear to those skilled in the art, these parameters are subject to a number of conventional constraints, such as: $I_0$ must fall within the circular buffer (i.e., B<=$I_0$<=(B+L)); M and L cannot both be odd/even (or else you can never reach the even/odd addresses); M cannot be greater than L (or the modulo-corrected pointer will still lie beyond the end of the buffer); etc. Subject to these common sense constraints, the several access parameters can be varied and the spreadsheet will replicate the resultant operation of my MAG 30'. In particular, as can be seen in FIGS. 5B, 6B and 7B, MAG 30' operates identically to MAG 30 (FIG. 3) whenever there are at least Two (2) instructions in a loop (i.e., LoopSize=2). For single-instruction loops (i.e., LoopSize=1), my special lookahead hardware is brought into operation (e.g., by the loop control logic (not shown)) to pre-calculate the lookahead pointer, (I+2M), the modulo corrected lookahead pointer, ((I+2M)−L), the double-modulo corrected lookahead pointer, ((I+2M)−2L), and the corresponding pointer selection criteria, ((I+2M)−(B+L)) and ((I+2M)−(B+2L)), which together control the selection of the correct One (1) of the several lookahead pointers.

Figure 7A:
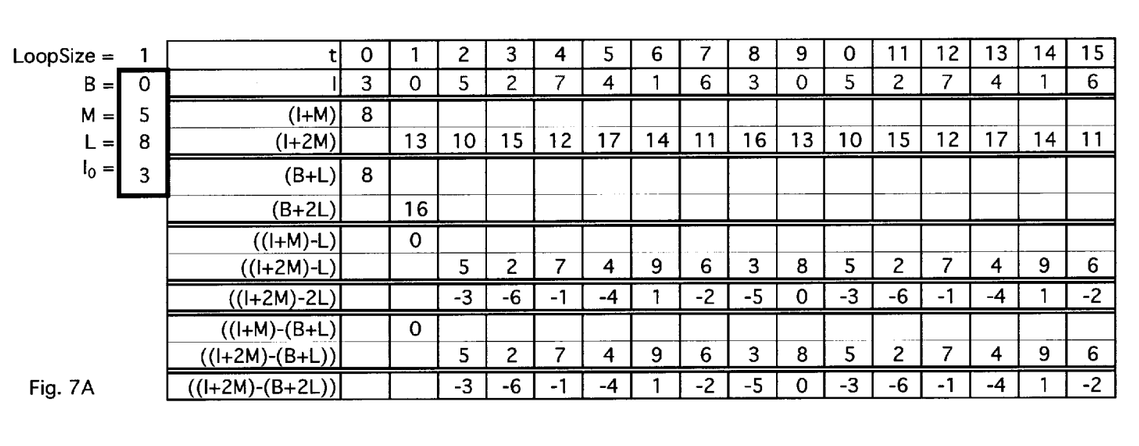
FIG. 7A and FIG. 7B, illustrates in timing diagram form the operation of the modulo address generator of FIG. 4 for a third selected example of circular buffer access parameters.
Figure 7B:
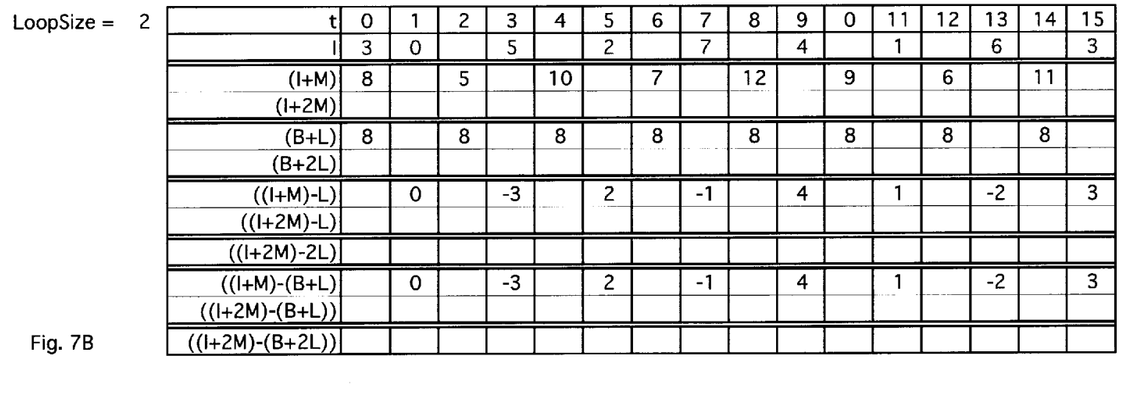

By way of example, assume that we have a single MAC instruction in our loop (and no other instructions of any type), and that the access parameters are selected as in FIG. 7, namely, B=0, M=5, L=8, and $I_0$=3. As shown in FIG. 7A (where LoopSize=1), during clock cycle t0, $I_0$ (i.e., 3), is forwarded by conventional control logic (not shown) as the pointer to be used to load the first operand. In parallel, sequential pointer generation stage 32' calculates, in CPA 36, the sequential pointer $I_1$ (i.e., ($I_0$+M) or 8), and, in CPA 38, the sequential pointer limit (i.e., (B+L) or 8).

During clock cycle t1, sequential pointer generation stage 32' calculates, in CPA 36, the lookahead pointer $I_2$ (i.e., ($I_0$+2M) or 13), and, in CPA 38, the lookahead pointer limit (i.e., (B+2L) or 16). Simultaneously, the modulo correction and pointer selection stage 34' uses the sequential pointer $I_1$ (which was calculated in CPA 36 during clock cycle t0) to calculate, in CPA 42, the modulo corrected sequential pointer $I_1$ (i.e., ($I_1$−L) or (($I_0$+M)−L) or 0), and, in CPA 44, the sequential pointer selection difference (i.e., ($I_1$−(B+L)) or (($I_0$+M)−(B+L)) or 0). Since, under these conditions, the sequential pointer selection difference is 0, indicating the sequential pointer $I_1$ is outside of the buffer, the modulo corrected sequential pointer $I_1$ (i.e., 0) is output as the pointer $I_1$. Note that I have "reused" CPA 38 to take advantage of the fact that (B+L) is a constant and, once calculated, can be held for the duration of the loop in the input latch of CPA 44, as (B+2L) will be held in the input latch of CPA 54.

During clock cycle t2, sequential pointer generation stage 32' only needs to calculate, in CPA 36, the lookahead pointer $I_3$ (i.e., ($I_1$+2M) or 10). Simultaneously, the modulo correction and pointer selection stage 34' uses the lookahead pointer $I_2$ (calculated in CPA 36 during clock cycle t1) to calculate, in CPA 42, the modulo corrected lookahead pointer $I_2$ (i.e., ($I_2$−L) or (($I_0$+2M)−L) or 5), and, in CPA 52, the double-modulo corrected lookahead pointer $I_2$ (i.e., ($I_2$−2L) or (($I_0$+2M)−2L) or −3), as well as the respective lookahead pointer selection differences (i.e., ($I_2$−(B+L)) or (($I_0$+2M)−(B+L)) or 5), in CPA 44, and (i.e. ($I_2$−(B+2L) or (($I_0$+2M)−(B+2L)) or −3) in CPA 54. Since, under these conditions, the lookahead pointer selection differences are 5 and −3, respectively, indicating that the lookahead pointer is outside of the buffer but the modulo corrected lookahead pointer $I_2$ (i.e., 5) is within the buffer, the modulo corrected lookahead pointer will be output as the next pointer $I_2$. Note that I have reused CPA 42 to calculate the modulo-corrected lookahead pointer $I_2$ since I no longer need to calculate any modulo-corrected sequential pointers. Similarly, I have reused CPA 44 to calculate the respective pointer selection difference (($I_2$+2M)−(B+L)).

During all subsequent clock cycles of this loop, MAG 30' continues to operate as described in the preceding paragraph, using in each successive iteration the pointer forwarded by the preceding iteration. Furthermore, except for the startup cycles t0 and t1, only the lookahead pointers will be used in the calculations. In effect, my MAG 30' takes advantage of the fact that the initial $I_0$ is guaranteed to be within the buffer so that the next $I_1$ cannot be more than L beyond the end of the buffer. Therefore, the hardware can utilize the first Two (2) clock cycles to get One (1) pointer cycle "ahead"; once ahead, it stays there for the duration of the loop! In this manner, a new pointer can be generated for each and every cycle for any number of iterations of a single instruction loop. Note, in particular, that in clock cycle t6, at which point both the lookahead pointer $I_6$ (i.e., 17) and the corrected lookahead pointer $I_6$ (i.e., 9) are outside the buffer, it is the double-modulo corrected lookahead pointer $I_6$ (i.e., 1) that is selected as the next pointer $I_6$. Thus, even for the difficult case illustrated in FIG. 7, my MAG 30' is capable of supplying a correct pointer every cycle, including both of the startup cycles t0 and t1! According to my analysis, this will be true regardless of the selected access parameters (subject, of course, to the constraints that I have discussed above).

In addition to the advantages discussed above, my MAG 30' allows the decision as to the size of the loop to be delayed as late as the start of clock cycle t1. As can be seen in the pseudocode, above, and in FIGS. 5, 6 and 7, the operation of MAG 30' during clock cycle t0 is independent of LoopSize! This characteristic relaxes the timing in the delivery of the LoopSize information to the MAG 30' from the loop control hardware (not shown).

When the LoopSize is greater than One (1), the MAG 30' will, at clock cycle t1, enter a two-cycle, purely sequential mode of operation. For convenience of reference, I refer to this sequential mode of operation of the MAG 30' as the "first mode of operation". In contrast, for LoopSize equal to One (1), the MAG 30' will, at clock cycle t1, enter a single-cycle, lookahead mode of operation wherein the lookahead hardware is active. I refer to this lookahead mode of operation of the MAG 30' as the "second mode of operation". In the timing diagrams of FIGS. 5–7, the first mode of operation is illustrated in the B portions while the second mode of operation is illustrated in the A portions.

Using state of the art design techniques, the sequential pointer generation stage 32' still has a critical speed path of about Nine (9) delay units: One (1) delay unit through the input MUXs; Two (2) delay units through the typical inter-stage latches that are provided on the inputs of CPA 36 and CPA 38; and Six (6) delay units through each of CPAs when implemented using fast dynamic adders. However, the modulo correction and pointer selection stage 34' now has Twelve (1) delay units: Two (2) delay units through the typical inter-stage latches that are provided on the inputs of CPA 42, CPA 44, CPA 52, and CPA 54; Six (6) gate delays through each of the CPAs when implemented using fast dynamic adders; Two (2) delay units through the pointer select control 56; One (1) delay unit through the MUX 46; and One (1) gate delay to account for the usual interconnection to the downstream logic. Thus, MAG 30' has an effective speed path of Twelve (12), which is still quite close to the desired performance.

Thus it is apparent that I have provided Two (2) pipelined modulo address generators that are especially well adapted for use in deeply pipelined digital signal processors: the first in which loops comprised of Two (2) or more instruction loops can be supported at full speed, but single instruction loops may incur stalls; and the second in which even single instruction loops can be supported at full speed, but at an additional cost in hardware. Those skilled in the art will recognize that modifications and variations can be made without departing from the spirit of my invention. Therefore, I intend that my invention encompass all such variations and modifications as fall within the scope of the appended claims.

What I claim is:

1. A two-stage, pipelined modulo address generator for generating from a current pointer into a circular buffer of size L, a next pointer into the buffer, the generator being operative in a selected one of first and second modes of operation, comprising:
   a pointer generation stage adapted to:
      in the first mode of operation:
         generate a sequential pointer which is a selected offset M from the current pointer; and
      in the second mode of operation:
         generate a lookahead pointer which is twice the selected offset from the current pointer; and
   a modulo correction and pointer selection stage adapted to:
      in the first mode of operation:
         generate from the sequential pointer, modulo L, a corrected sequential pointer; and
         provide as the next pointer:
            the sequential pointer, if the sequential pointer is within the buffer; and
            the corrected sequential pointer, otherwise; and
      in the second mode of operation:
         generate from the lookahead pointer, modulo L, a corrected lookahead pointer;
         generate from the lookahead pointer, modulo 2L, a double-corrected lookahead pointer; and
         provide as the next pointer:
            the lookahead pointer, if the lookahead pointer is within the buffer;
            the corrected lookahead pointer, if the lookahead pointer is not within the buffer but the corrected lookahead pointer is within the buffer; and
            the double-corrected lookahead pointer, otherwise.

2. The modulo address generator of claim 1 wherein in the second mode of operation:
   the pointer generation stage is adapted to generate a lookahead pointer limit which corresponds to the end of the buffer, and a double lookahead pointer limit which corresponds to the twice the end of the buffer; and
   the modulo correction and pointer selection stage is further characterized as providing as the next pointer:
      the lookahead pointer, if the lookahead pointer is not greater than the lookahead pointer limit;
      the corrected lookahead pointer, if the lookahead pointer is greater than the lookahead pointer limit and the corrected lookahead pointer is not greater than the double lookahead pointer limit; and
      the double-corrected lookahead pointer, otherwise.

3. The modulo address generator of claim 2 wherein in the second mode of operation, the modulo correction and pointer selection stage is further characterized as generating:
   the corrected lookahead pointer by subtracting the lookahead pointer limit from the lookahead pointer; and
   the double-corrected lookahead pointer by subtracting the double lookahead pointer limit from the lookahead pointer.

4. The modulo address generator of claim 1 wherein the pointer generation stage comprises:
   a first adder to generate, in the second mode of operation, the lookahead pointer by adding twice M to the current pointer; and
   a second adder to generate, in the second mode of operation, the lookahead pointer limit by adding L to a base, B, of the buffer, and to generate the double lookahead pointer limit by adding twice L to the base, B.

5. The modulo address generator of claim 4 wherein the modulo correction and pointer selection stage comprises:

a third adder to generate, in the second mode of operation, the corrected lookahead pointer by subtracting L from the lookahead pointer;

a fourth adder to generate, in the second mode of operation, the double-corrected lookahead pointer by subtracting twice L from the lookahead pointer;

a fifth adder to generate, in the second mode of operation, a first lookahead selection criteria by subtracting the lookahead pointer limit from the lookahead pointer; and a sixth adder to generate, in the second mode of operation, a second lookahead selection criteria by subtracting the double lookahead pointer limit from the lookahead pointer; and an output selector for selecting for output as the next pointer in the second mode of operation:
  the lookahead pointer if the first lookahead selection criteria is negative;
  the corrected lookahead pointer if the lookahead selection criteria is not negative and the second lookahead selection criteria is negative; and
  the double corrected lookahead pointer otherwise.

6. The modulo address generator of claim 1 wherein:
  in the first mode of operation, the modulo address generator generates the next pointer with an associated first latency; and
  in the second mode of operation, the modulo address generator generates the next pointer with an associated second latency; and
wherein the second latency is less than the first latency.

7. A pipelined modulo address generation method for generating from a current pointer into a circular buffer of size L, a next pointer into the buffer, the generator being operative in a selected one of first and second modes of operation, comprising the steps:
  in the first mode of operation:
    in a pointer generation stage, generating a sequential pointer which is a selected offset M from the current pointer; and
    in a modulo correction and pointer selection stage:
      generating from the sequential pointer, modulo L, a corrected sequential pointer; and
      providing as the next pointer:
        the sequential pointer, if the sequential pointer is within the buffer; and
        the corrected sequential pointer, otherwise;
  in the second mode of operation:
    in the pointer generation stage, generating a lookahead pointer which is twice the selected offset from the current pointer; and
    in the modulo correction and pointer selection stage:
      generating from the lookahead pointer, modulo L, a corrected lookahead pointer;
      generating from the lookahead pointer, modulo 2L, a double-corrected lookahead pointer; and
      providing as the next pointer:
        the lookahead pointer, if the lookahead pointer is within the buffer;
        the corrected lookahead pointer, if the lookahead pointer is not within the buffer but the corrected lookahead pointer is within the buffer; and
        the double-corrected lookahead pointer, otherwise.

8. The method of claim 7, wherein in the second mode of operation, the method further comprises the steps:
  in the pointer generation stage:
    generating a lookahead pointer limit which corresponds to the end of the buffer; and
    generating a double lookahead pointer limit which corresponds to the twice the end of the buffer; and
  in the modulo correction and pointer selection stage:
    providing as the next pointer:
      the lookahead pointer, if the lookahead pointer is not greater than the lookahead pointer limit;
      the corrected lookahead pointer, if the lookahead pointer is greater than the lookahead pointer limit and the corrected lookahead pointer is not greater than the double lookahead pointer limit; and
      the double-corrected lookahead pointer, otherwise.

9. The method of claim 8 wherein in the second mode of operation, the method further comprises the steps of:
  in the modulo correction and pointer selection stage:
    generating the corrected lookahead pointer by subtracting the lookahead pointer limit from the lookahead pointer; and
    generating the double-corrected lookahead pointer by subtracting the double lookahead pointer limit from the lookahead pointer.

10. The method of claim 7, wherein in the second mode of operation, the method further comprises the steps:
  in the pointer generation stage:
    generating the lookahead pointer by adding twice M to the current pointer;
    generating the lookahead pointer limit by adding L to a base, B, of the buffer; and
    generating the double lookahead pointer limit by adding twice L to the base, B.

11. The method of claim 10 wherein in the second mode of operation, the method further comprises the steps of:
  generating the corrected lookahead pointer by subtracting L from the lookahead pointer;
  generating the double-corrected lookahead pointer by subtracting twice L from the lookahead pointer;
  generating a first lookahead selection criteria by subtracting the lookahead pointer limit from the lookahead pointer; and
  generating a second lookahead selection criteria by subtracting the double lookahead pointer limit from the lookahead pointer; and
  selecting for output as the next pointer:
    the lookahead pointer if the first lookahead selection criteria is negative;
    the corrected lookahead pointer if the first lookahead selection criteria is not negative and the second lookahead selection criteria is negative; and
    the double corrected lookahead pointer otherwise.

12. The method of claim 7 wherein:
  in the first mode of operation, the modulo address generator generates the next pointer with an associated first latency; and
  in the second mode of operation, the modulo address generator generates the next pointer with an associated second latency; and
wherein the second latency is less than the first latency.

* * * * *